(12) United States Patent
Mandelli et al.

(10) Patent No.: US 10,250,826 B2
(45) Date of Patent: Apr. 2, 2019

(54) IMAGE SENSORS HAVING EXTENDED DYNAMIC RANGE (71) Applicant: InVisage Technologies, Inc., Menlo Park, CA (US)

(72) Inventors: Emanuele Mandelli, Mountain View, CA (US); Nikolai Bock, San Jose, CA (US)

(73) Assignee: InVisage Technologies, Inc., Newark, CA (US)

( * ) Notice: Subject to any disclaimer, the term of this patent is extended or adjusted under 35 U.S.C. 154(b) by 182 days.

(21) Appl. No.: 15/406,740

(22) Filed: Jan. 15, 2017

(65) Prior Publication Data
US 2017/0208273 A1    Jul. 20, 2017

Related U.S. Application Data (60) Provisional application No. 62/279,618, filed on Jan. 15, 2016.

(51) Int. Cl.
*H04N 5/335* (2011.01)
*H04N 5/355* (2011.01)
*H04N 5/353* (2011.01)
*H04N 5/378* (2011.01)
*H04N 5/363* (2011.01)

(52) U.S. Cl.
CPC ....... *H04N 5/35572* (2013.01); *H04N 5/3535* (2013.01); *H04N 5/3559* (2013.01); *H04N 5/363* (2013.01); *H04N 5/378* (2013.01)

(58) Field of Classification Search
CPC .......................... H04N 5/363; H04N 5/35572
See application file for complete search history.

(56) References Cited

U.S. PATENT DOCUMENTS

| 7,075,049 | B2 | 7/2006 | Rhodes et al. |
| 8,508,638 | B2 | 8/2013 | Hynecek |
| 2009/0090846 | A1 | 4/2009 | Stevens et al. |
| 2009/0195431 | A1 | 8/2009 | Snoeij et al. |
| 2010/0157098 | A1 | 6/2010 | Altice et al. |
| 2011/0155892 | A1 | 6/2011 | Neter et al. |
| 2012/0038809 | A1 | 2/2012 | Lee et al. |
| 2013/0113969 | A1 | 5/2013 | Manabe et al. |
| 2015/0145007 | A1 | 5/2015 | Chieh et al. |
| 2015/0189199 | A1 | 7/2015 | Borremans et al. |
| 2016/0037099 | A1* | 2/2016 | Mandelli ................ H04N 5/363 348/241 |

OTHER PUBLICATIONS

"International Application Serial No. PCT/US2017/013609, International Search Report dated Apr. 7, 2017", 2 pgs.

(Continued)

*Primary Examiner* — Gary C Vieaux
(74) *Attorney, Agent, or Firm* — Kligler & Associates (57) ABSTRACT In various embodiments, an electronic image sensor having extended dynamic range comprises, for example, a pixel circuit and a column readout circuit. The column readout circuit includes, for example, a correlated double-sampling (CDS) capacitor, one or more CDS clamp switches, a single slope analog-to-digital converter (ADC) circuit, and a column memory. Other devices and methods are disclosed.

10 Claims, 13 Drawing Sheets

(56) References Cited

OTHER PUBLICATIONS

"International Application Serial No. PCT/US2017/013609, Written Opinion dated Apr. 7, 2017", 5 pgs.
Fowler, Boyd, et al., "Low Noise Readout using Active Reset for CMOS APS", Proceedings of SPIE, vol. 3965, (May 2000).
Sugawa, S., et al., "A 100 dB Dynamic Range CMOS Image Sensor Using a Lateral Overflow Integration Capacitor", ISSCC, Dig. Tech. Papers, (2005), 352-353.

* cited by examiner

Fig. 1

PRIOR ART

IMAGE SENSORS HAVING EXTENDED DYNAMIC RANGE

RELATED APPLICATIONS

This application claims the benefit of priority to U.S. patent application Ser. No. 62/279,618 and entitled, "IMAGE SENSORS HAVING EXTENDED DYNAMIC RANGE," filed Jan. 15, 2016, which is hereby incorporated by reference in its entirety.

TECHNICAL FIELD

The present invention generally relates to optical and electronic devices, systems, and methods that include optically sensitive material, such as nanocrystals or other optically sensitive material, and methods of making and using the devices and systems.

BACKGROUND

A major drawback of a typical three transistor (3T) pixel circuit is high thermal (e.g., kTC) noise, which deteriorates dynamic range and low light performance. The 3T pixel kTC noise depends on pixel conversion gain. Unfortunately, a high-conversion gain results in the both poor dynamic range and low signal-to-noise ratio (SNR) at high light. Considerations in the prior art included proposals to reduce kTC noise with feedback amplifiers and parametric resets of detection nodes incorporating voltage dependent capacitor components. The feedback amplifier approach requires significant additional power. Speed is limited by a slow ramping of reset voltage. The parametric reset with voltage depend capacitor has never, to date, actually been implemented. Further, some persons of ordinary skill in the art have expressed concern about the feasibility of this approach. Moreover, a proposed dual conversion gain pixel can improve only inter-scene dynamic range. Additionally, a proposed overflow principle for four transistor (4T) pixel dynamic range extension requires multiple readout paths and off chip processing.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

In contrast to the proposed techniques of the prior art, and as will be described in more detail below, the disclosed subject matter invention allows kTC noise reduction by using high conversion gain at low light. Further, the disclosed subject matter allows extending intra-scene dynamic range with an overflow concept. The approach defined by the various embodiments herein is simple and effective. It does not require an additional feedback amplifier, which requires more space and more power. The disclosed subject matter, in various embodiments, discloses adding overflow capacitance to achieve higher dynamic range and keep high conversion gain for low light situations. This is dual conversion gain pixel. High conversion gain is for lower kTC noise at low light. Low conversion gain is for extending dynamic range and increasing SNR at high light. Operation of the proposed pixel is based on charge conservation, which allows maintaining a linear response. Having a conversion gain ratio multiple of, for example, two, allows automatically adjust gain by data shift in column memory. In various embodiments, kTC noise is reduced by sampling multiple resets.

Having a conversion gain as high as 350 µV/e results in 9-e kTC noise. Double sampling increases the noise by the square root of two times. The same time soft reset decreases it by the same amount. A 3T pixel signal readout is followed by reset readout. To reduce temporal noise even further, one can use multiple pixel resets. Every reset is followed by conversion. An averaging operation reduces temporal noise by the square root of n samples. Reset noise introduced by a previous reset remains unaffected though.

Figure 8:
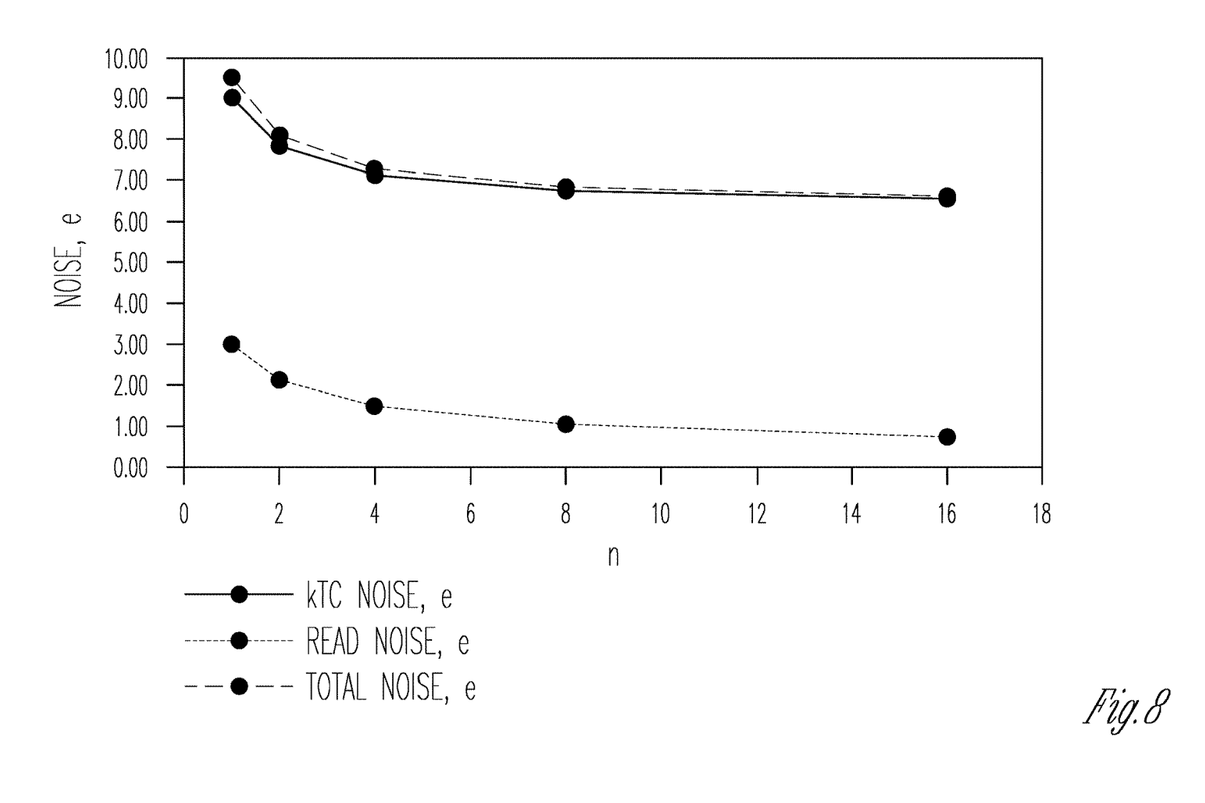
FIG. 8 shows a graph relating intensity of various noise levels as a function of the number of resets according to various embodiments.
Figure 9:
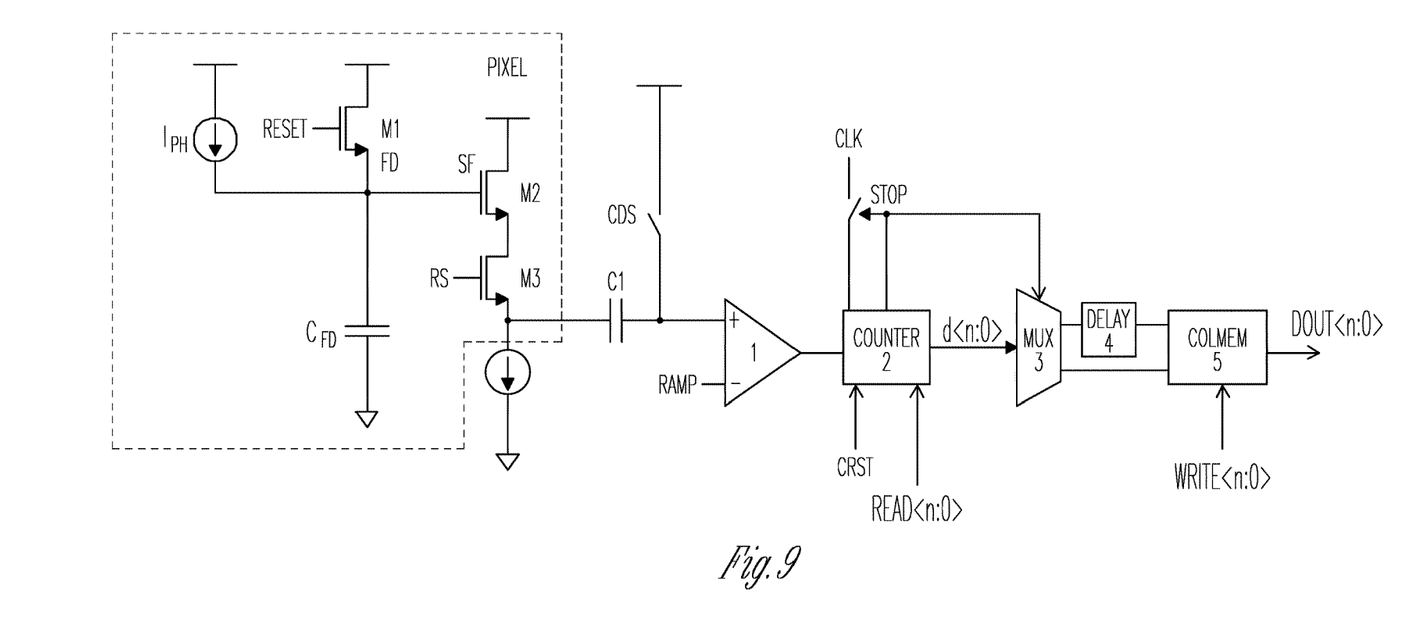
FIG. 9 shows an alternative pixel circuit in accordance with various embodiments.
Figure 10:
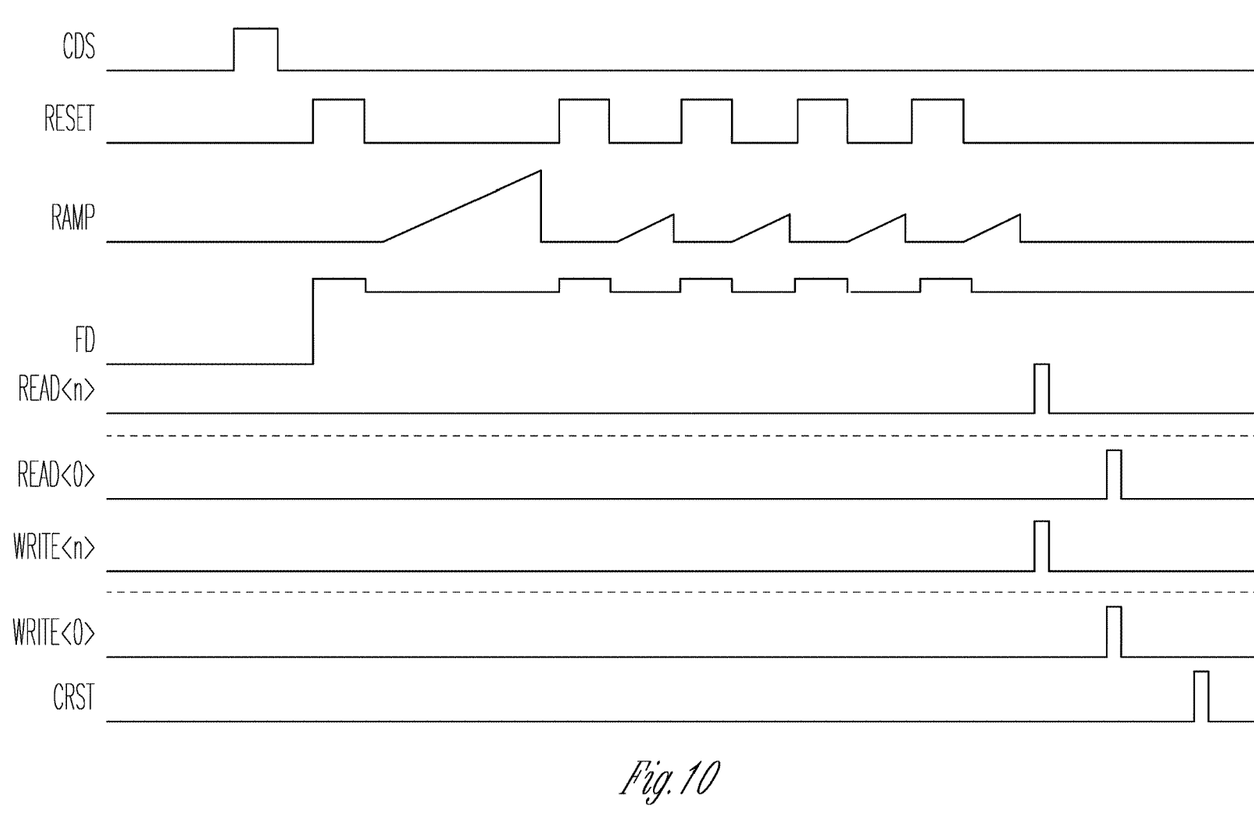
FIG. 10 shows an example of a timing diagram that can be used with the alternative pixel circuit of FIG. 9.
Figure 11:
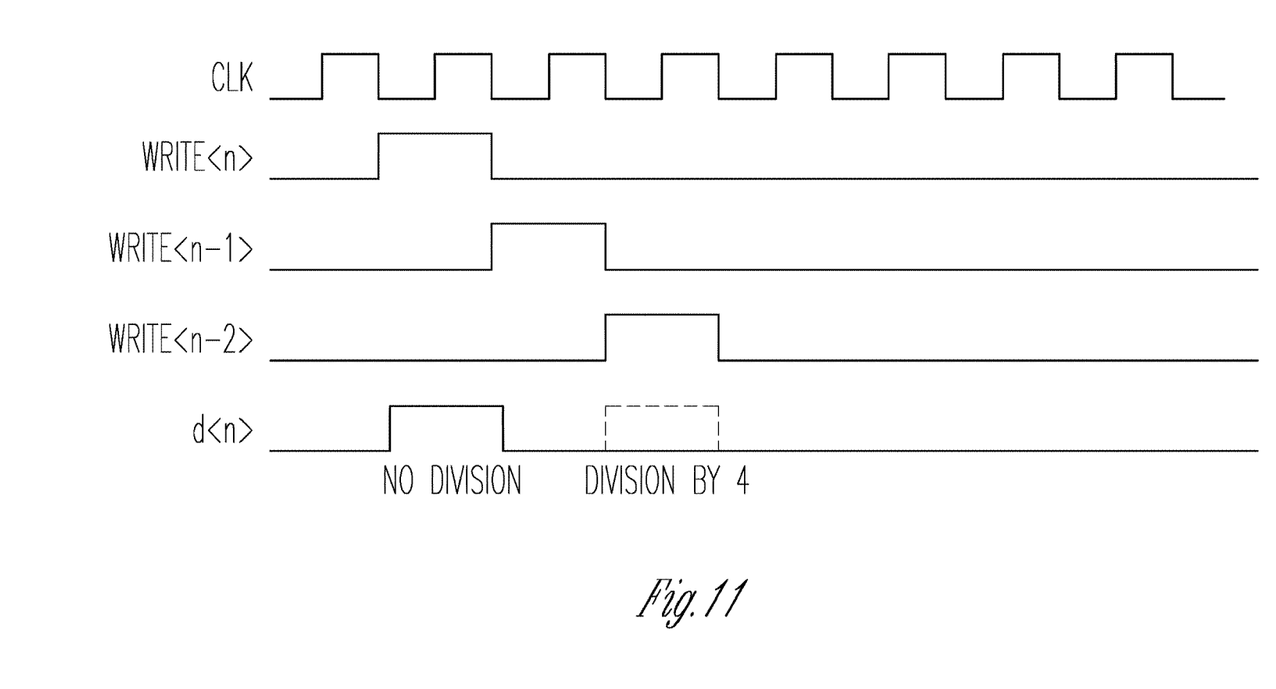
FIG. 11 shows a timing diagram related to a column memory write according to an embodiment.

FIG. 8 shows an example of noise reduction with n resets. In this example, the most noise reduction happens at n=4. An embodiment of a related circuit diagram is shown in FIG. 9. A column circuit consists of a correlated double-sampling (CDS) circuit, a single slope analog-to-digital converter (ADC), and a column memory (5). The ADC consists of a comparator (1) and a COUNTER (2). In the first phase of readout, a pixel signal is clamped on column CDS capacitor C1. An example related timing diagram is shown in FIG. 10. With concurrent reference to FIGS. 9 and 10, a pixel reset is followed by an ADC conversion. The second conversion and subsequent conversions are not necessarily intended to be full-scale conversions, which can minimize its impact on row time. In an embodiment, we actually need low read temporal noise only at low lights. In a high light situation, photon noise dominates anyway. Therefore, the counter (2) of FIG. 9 adds signals only below some arbitrary (e.g., predetermined) threshold. If a signal is higher than the threshold, then a STOP signal disconnects the Clk and stops the counter (2). The same STOP signal controls the MUX (3) of FIG. 9. The counter data go substantially without delay, or with minimal delay, into the column memory (5) if the STOP signal is high. Otherwise the data will be delayed by two clock cycles. This example is for division by 4 if there are four conversions. Therefore, in this embodiment, averaging is performed only for low signals. FIG. 11 shows a division-by-4 timing diagram. After writing the ADC data into column memory (5) of FIG. 9, the CRST signal of FIG. 10 resets the counter (2).

Figure 1:
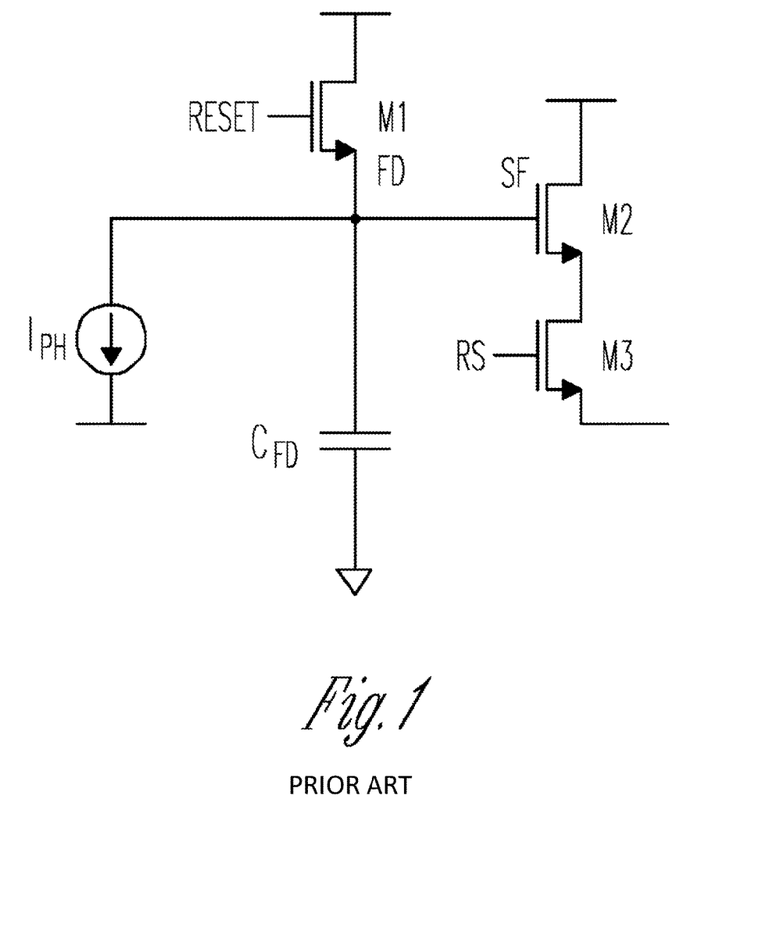
FIG. 1 shows a schematic diagram for a three-transistor (3T) pixel circuit of the prior art.

A simplified circuit diagram of the prior art is shown in FIG. 1. A major drawback of this circuit is high kTC noise related to fluctuation of reset charge of the detection node or floating diffusion (FD). Unfortunately, reduction of the FD capacitance results in pixel dynamic range drop.

Figure 2:
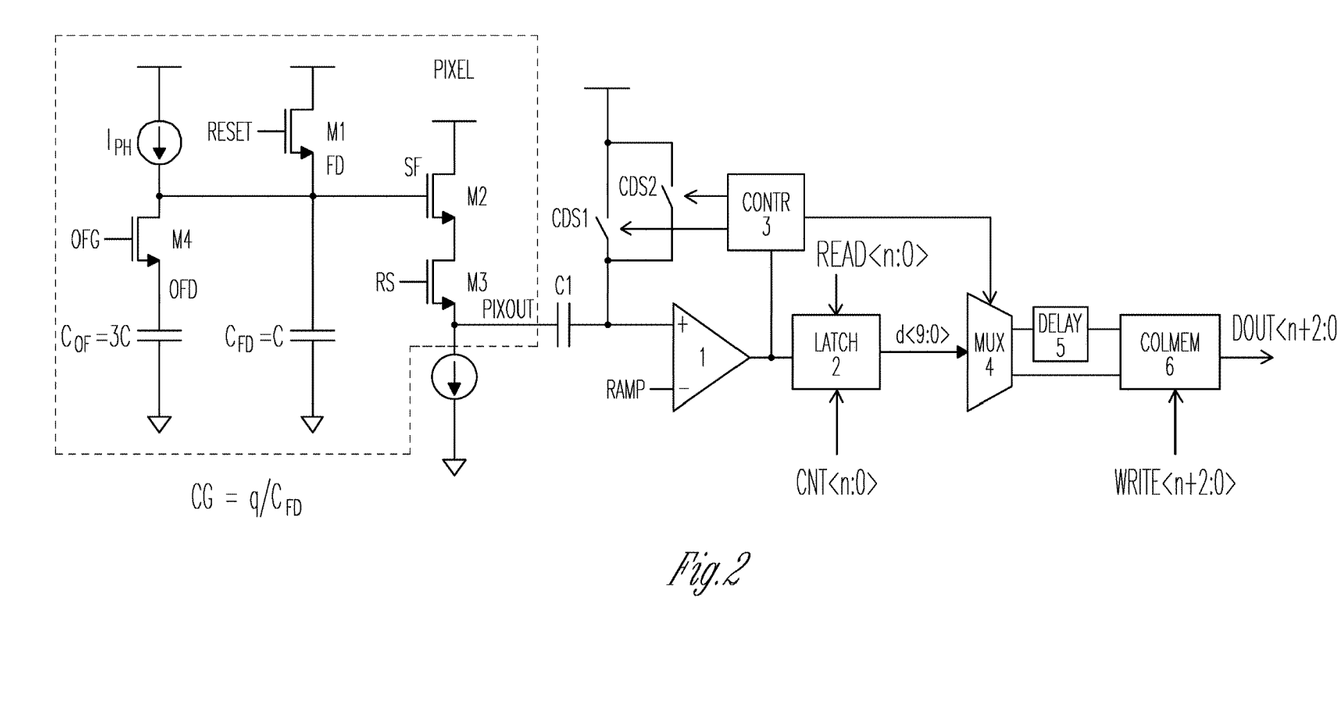
FIG. 2 shows an overflow pixel and column circuit diagram in accordance with various embodiments.

To resolve this discrepancy, an overflow (OF) capacitor $C_{OF}$ is added as shown in FIG. 2. The proposed pixel also includes a transistor M4 that couples the OF capacitor to FD. A pixel conversion gain (CG) is given by $$CG=q/C_{FD}$$

where q is the elementary charge and $C_{FD}$ is total FD node capacitance.

Figure 3A:
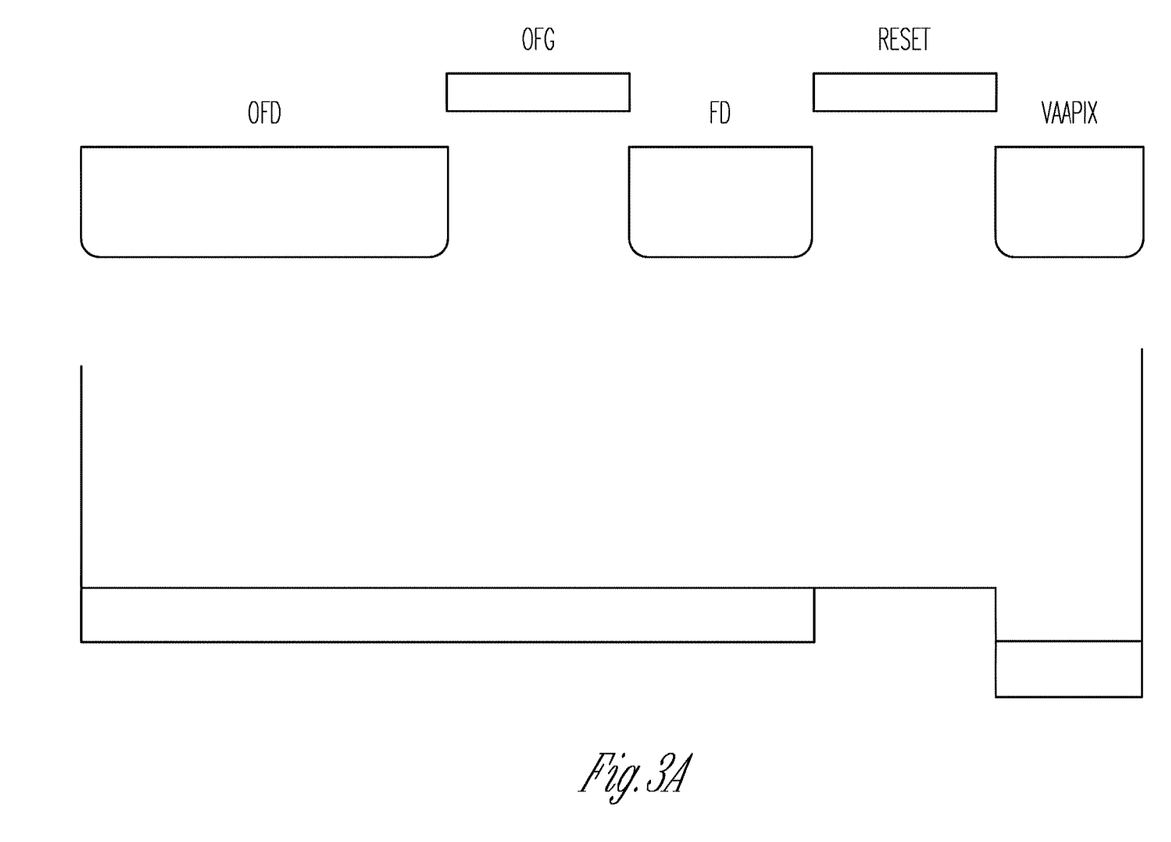
FIGS. 3A through 3C show various embodiments of pixel potential diagrams for soft reset.
Figure 3B:
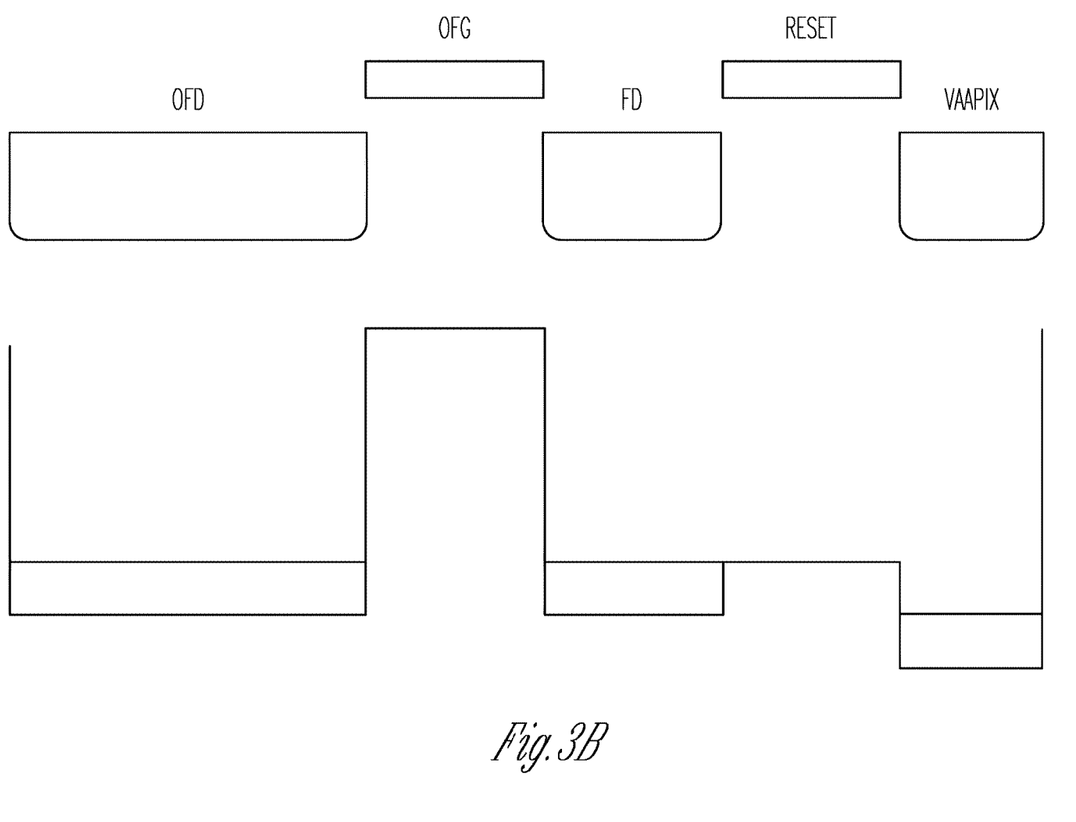
Figure 3C:
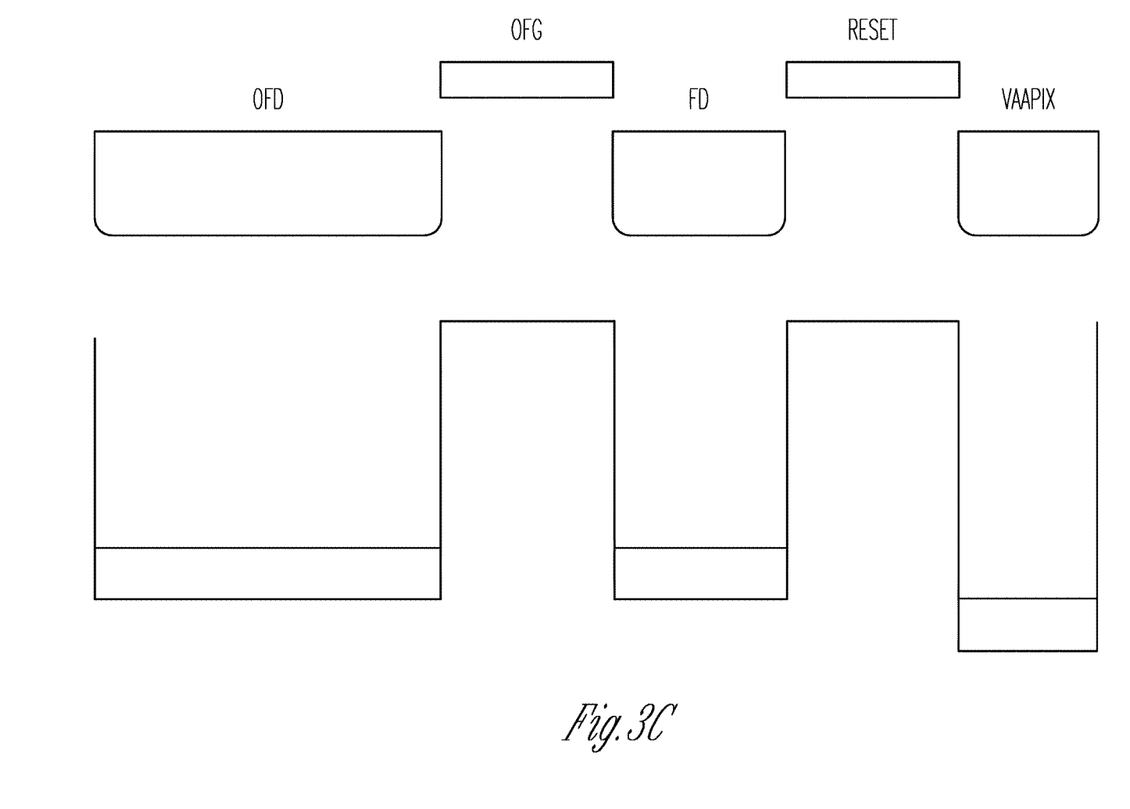
Figure 4:
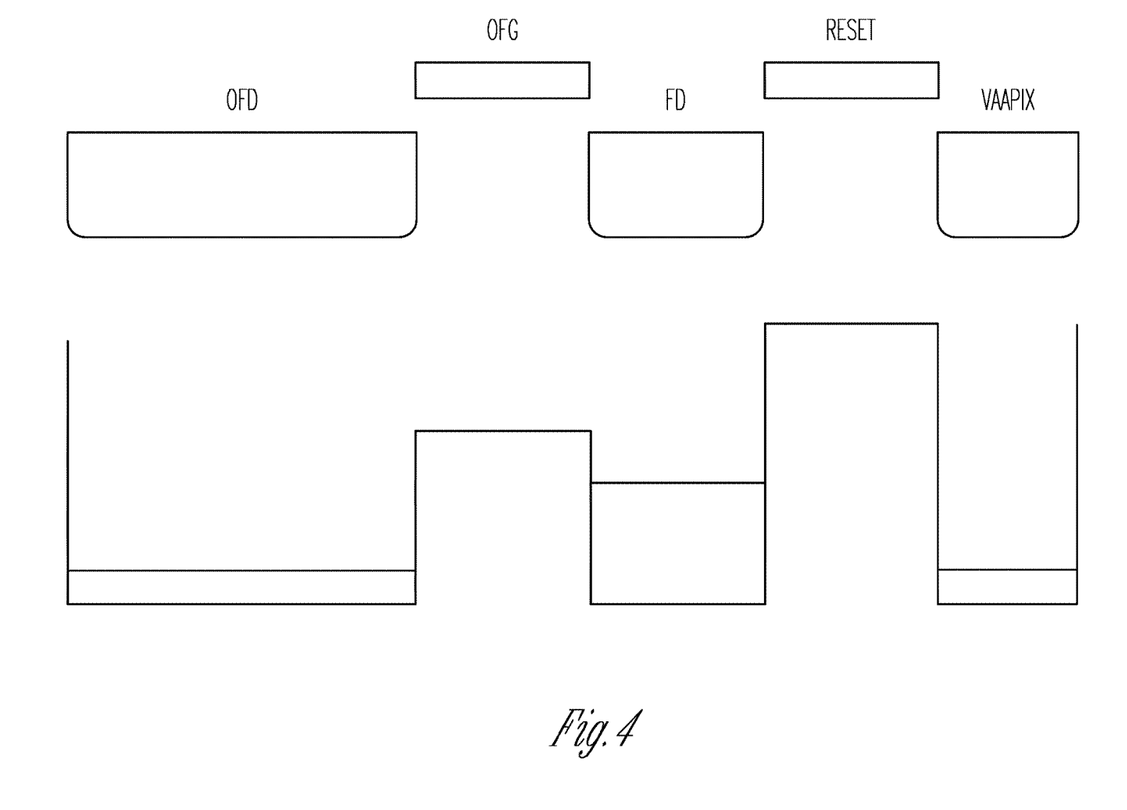
FIG. 4 shows an embodiment of a pixel potential diagram for integration at low light.
Figure 5:
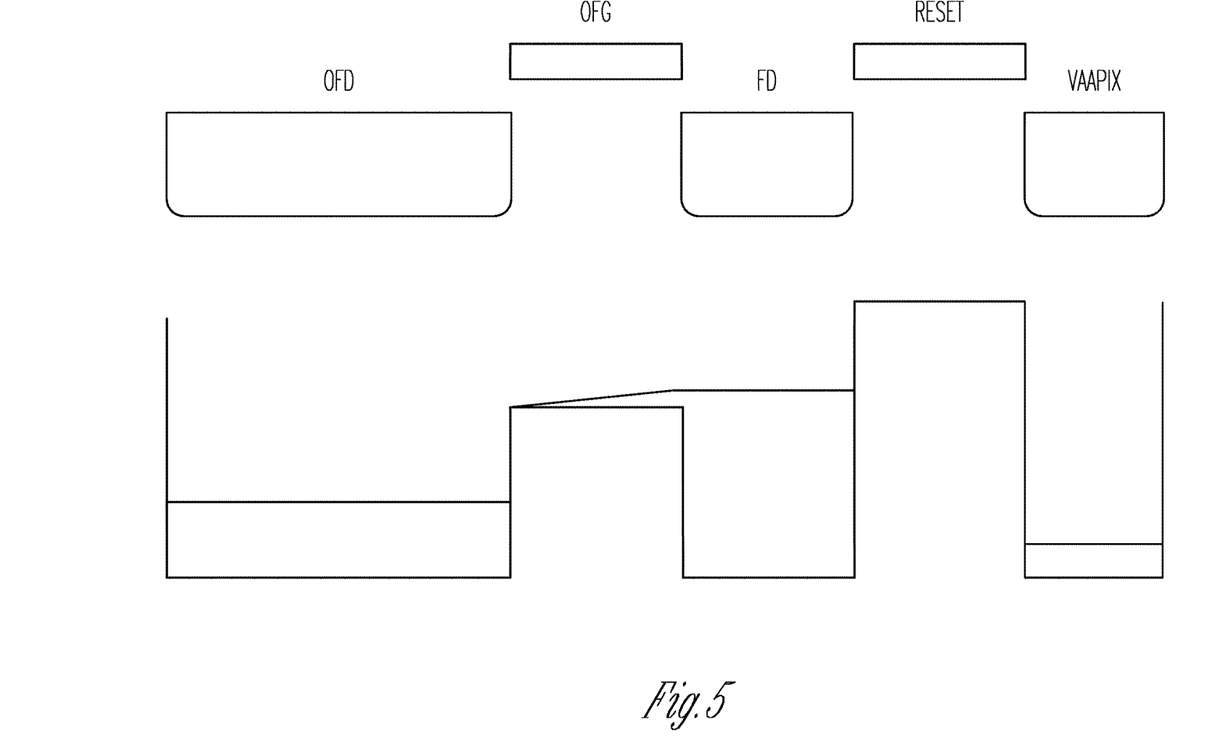
FIG. 5 shows an embodiment of a pixel potential diagram for integration at high light.
Figure 6:
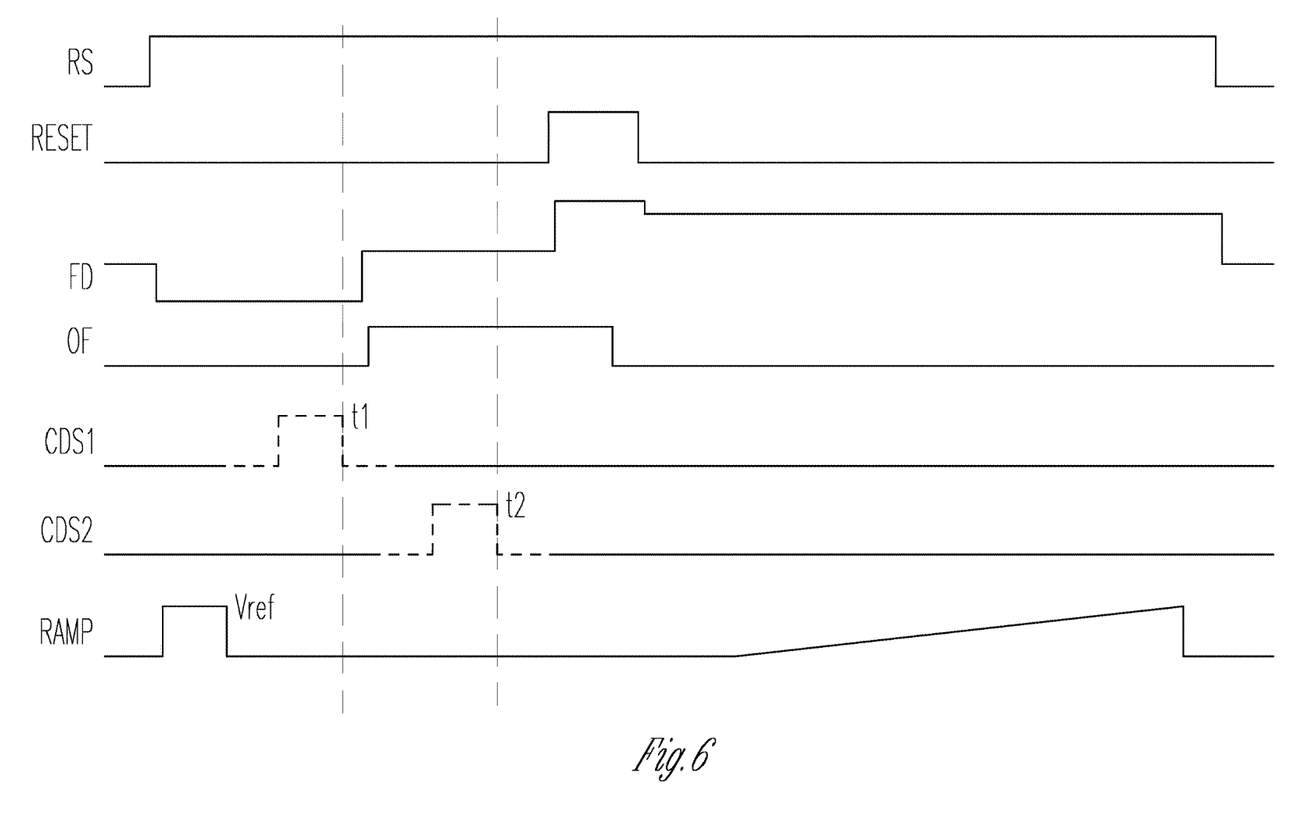
FIG. 6 shows a timing diagram of an embodiment related to a readout phase.

The circuit of FIG. 2 operates as follows in an embodiment. During pixel reset, the M4 transistor is on. It can be a soft reset or a hard reset. A soft reset sequence is shown in FIGS. 3A through 3C. A soft reset reduces kTC noise by about 3 dB but uses a flush operation to avoid lag and low light signal loss. The next step is to raise a potential barrier under the OFG gate of M4 by setting the gate voltage to a low level. Building up a barrier under the RESET gate of M1 completes the reset operation. The FD node now starts collecting photo charge. No photo charge goes to the OFD node at low light condition as shown at FIG. 4. Photo charge starts overflowing into the OFD node only at a high light situation as shown in FIG. 5. A readout phase starts from selecting pixels in a certain row by setting the RS signal to high level as shown in FIG. 6. Now the column readout circuit shown in FIG. 2 can sense the FD signal.

Figure 7:
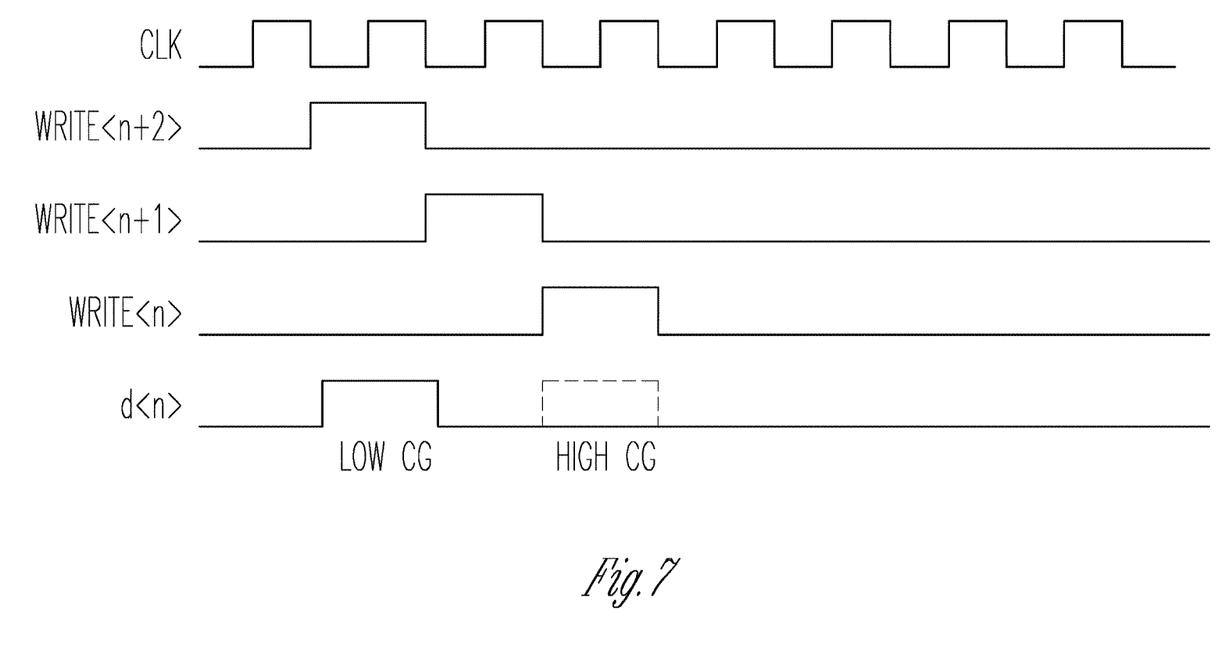
FIG. 7 shows a timing diagram related to a column memory write according to an embodiment.

The example column readout circuit of FIG. 2 consists of a CDS capacitor C1, CDS clamp switches CDS1 and CDS2, a single slope ADC and a column memory (6). The single slope ADC consists of a comparator (1) and a LATCH (2). In the beginning of a readout cycle, the ADC comparator (1) compares the FD signal with a predetermined threshold level. It is implemented by applying a pulse of a given amplitude to the negative input of the comparator (1). If the comparator (1) does not flip, then the CONTR logic block (3) activates the CDS1 clamp, which charges C1 to the FD signal when the OFD node is not connected. If the comparator (1) does flip, then the CDS2 clamp is activated after the OFG switch (M4) is on. In this case the column circuit senses shared charge on the OFD and FD nodes. Correspondingly, the capacitor C1 is charged to that signal. Now the difference between the signal stored on C1 and reset is applied to the positive input of the comparator (1). The readout cycle continues with A-to-D conversion. A counter signal (CNT<n:0>) is latched when the comparator (1) flips. The latched data are written in serial into the column memory (6) after conversion. The CONTR logic block (3) controls the MUX (4) at the LATCH (2) output. In the case of high conversion gain, it sends the data through the delay line (5). For example, two clocks delays are used for division by 4 as shown in FIG. 7.

In various embodiments, the circuit of FIG. 2 may enable a pixel dynamic range extension by using the small capacitance C chosen as, for example, about 0.5 fF, or the sum of capacitance C and 3C, for example, about 2 fF, to convert the photo-generated charges in voltage.

In embodiments, the capacitor C1 may sample the voltage of node PIXOUT (see FIG. 2) at time t1 (see FIG. 6) when the photo-charge is integrated on capacitor C only, or sample and hold the voltage of node RB1 at time t2 when the photo-generated charge is integrated on capacitor C+3C.

In embodiments, the voltage V1 sampled and held at time t1 (FIG. 6) and the voltage held at time t2 (FIG. 6) are scaled by $2^{n-1}$, where n is an integer number. In this case, the gain scales by $2^n$.

In embodiments, the overflow control gate OFG voltage (FIG. 2) can be set statically to high or low voltage. When the OFG gate voltage is high, for example, about 3V, the pixel behaves as a pixel with conversion gain equal to q/(c+3C) and full well equal to FD dynamic range Vfd, max multiplied by (C+3C), for example, 2 fF/1 V=12,500 electrons. When the OFG gate voltage is low, for example, about 0V, the pixel behaves as a pixel with conversion gain equal to q/C and full well of C*Vfd,max, for example, 05 fF/1 V=3125 electrons.

Frames with the OFG gate set high can be interleaved with frames where the OFG gate is set low to obtain a well-known 'frame switching' type of dynamic range expansion.

Alternatively, the OFG gate voltage can switch between a low voltage and a high voltage during each line, as shown in FIG. 6. During the 'OFG gate low' phase, the voltage on PIXOUT (FIG. 2) is compared to a fixed reference, Vref (FIG. 6), and depending on the result of the comparison, a logic controller CONTR (FIG. 2) samples on capacitor C1 the voltage at node PIXOUT either when the OV gate is low or when the OFG gate is high. By doing so, the voltage sampled on capacitor C1 is equal to Ne/C or Ne/2λ(n−1)*C, where Ne is the number or photo-charges collected in the pixel on node FD.

The voltage selected for Vref determines when the pixel is used in low dynamic range lower noise (mode 1) or high dynamic range higher noise (mode 2). This voltage might change column-to-column and pixel-to-pixel due to process variations, causing some pixels of the same or similar illumination level to be in mode 1, and others to be in mode 2. This is a common high dynamic range (HDR) effect and is known as a 'stitching' problem. Sophisticated algorithms, known independently in the art, exist to reduce and eliminate or reduce this problem from HDR images.

Moreover, the ratio between the capacitors C and 3C can be controlled closely along the pixel array, as any mismatch in value may show as pixel photo response non-uniformity (PRNU) in a final HDR image.

In various embodiments, an electronic device, such as an electronic image sensor having extended dynamic range, comprises a pixel circuit and a column readout circuit. The column readout circuit includes a correlated double-sampling (CDS) capacitor, one or more CDS clamp switches, a single slope analog-to-digital converter (ADC) circuit, and a column memory.

In various embodiments, the single slope ADC includes a comparator and a latch.

In various embodiments, the pixel circuit comprises a three transistor (3T) pixel circuit and further comprises an overflow gate.

In various embodiments, an electronic device further comprises an automatic circuit configured to reset a pixel multiple times only during a time period when a signal is below a predetermined threshold for the 3T pixel circuit with the overflow gate.

In various embodiments, an electronic device further comprises an automatic gain control system for the 3T pixel circuit having an overflow gate.

In various embodiments, the pixel circuit comprises a three transistor (3T) pixel circuit having an additional gate configured to increase conversion gain.

In various embodiments, the pixel circuit comprises a three transistor (3T) pixel circuit having an additional gate configured to enhance dynamic range.

In various embodiments, the pixel circuit comprises a three transistor (3T) pixel circuit having an additional gate configured to allow two different dynamically controllable conversion gains.

In various embodiments, the pixel circuit comprises a three transistor (3T) pixel circuit having an additional gate configured to allow two different conversion gains that are sequentially switchable from high to low.

In various embodiments, the pixel circuit comprises a three transistor (3T) pixel circuit having an additional gate configured to allow two sequential readouts with high and low conversion gain in a same exposure.

In various embodiments, a method, comprises lowering pixel read noise in an electronic circuit by resetting a pixel multiple times.

In various embodiments, a method further comprises resetting the pixel multiple times automatically only during a time period when a signal is below a predetermined threshold.

In various embodiments, an electronic device comprises, for example, a 3T pixel circuit with an additional overflow gate.

In various embodiments, an electronic device comprises, for example, a 3T pixel circuit with an additional gate used to increase conversion gain.

In various embodiments, an electronic device comprises, for example, a 3T pixel circuit with an additional gate used to enhance dynamic range.

In various embodiments, an electronic device comprises, for example, a 3T pixel circuit with an additional gate, which allows two different dynamically controllable conversion gains.

In various embodiments, an electronic device comprises, for example, a 3T pixel circuit with an additional gate, which allows two different conversion gains that can be sequentially switched from high to low.

In various embodiments, an electronic device comprises, for example, a 3T pixel circuit with an additional gate, which allows two sequential readouts with high and low conversion gain in the same exposure.

In various embodiments, an electronic device comprises, for example, an automatic gain control system for a 3T pixel circuit with overflow gate.

In various embodiments, a method comprises, for example, lowering pixel read noise by resetting the pixel multiple times.

In various embodiments, an automatic method comprises, for example, resetting the pixel multiple times only when the signal is below a certain (e.g., predetermined) threshold.

In various embodiments, an automatic method comprises, for example, resetting the pixel multiple times only when the signal is below a certain threshold for the 3T pixel with an overflow gate.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list, and any combination of the items in the list.

The above description of embodiments is not intended to be exhaustive or to limit the systems and methods to the precise forms disclosed. While specific embodiments of, and examples for, the embodiments are described herein for illustrative purposes, various equivalent modifications are possible within the scope of the systems and methods, as those skilled in the relevant art will recognize. The teachings of the embodiments provided herein can be applied to other systems and methods, not only for the systems and methods described above.

The elements and acts of the various embodiments described above can be combined to provide further embodiments. These and other changes can be made to the embodiments in light of the detailed description provided herein.

What is claimed is:

1. An electronic device, comprising:
   a pixel circuit, comprising an overflow gate;
   an automatic circuit configured to reset a pixel a plurality of times only during a time period when a signal detected at the pixel is below a predetermined threshold for the pixel circuit with the overflow gate; and
   a column readout circuit, the column readout circuit including a correlated double-sampling (CDS) capacitor, one or more CDS clamp switches, a single slope analog-to-digital converter (ADC) circuit, and a column memory.

2. The electronic device of claim 1, wherein the single slope ADC includes a comparator and a latch.

3. The electronic device of claim 1, wherein the pixel circuit comprises a three transistor (3T) pixel circuit.

4. The electronic device of claim 3, further comprising an automatic gain control system for the 3T pixel circuit having the overflow gate.

5. The electronic device of claim 1, wherein the pixel circuit comprises a three transistor (3T) pixel circuit having an additional gate configured to increase conversion gain.

6. The electronic device of claim 1, wherein the pixel circuit comprises a three transistor (3T) pixel circuit having an additional gate configured to enhance dynamic range.

7. The electronic device of claim 1, wherein the pixel circuit comprises a three transistor (3T) pixel circuit having an additional gate configured to allow two different dynamically controllable conversion gains.

8. The electronic device of claim 1, wherein the pixel circuit comprises a three transistor (3T) pixel circuit having an additional gate configured to allow two different conversion gains that are sequentially switchable from high to low.

9. The electronic device of claim 1, wherein the pixel circuit comprises a three transistor (3T) pixel circuit having an additional gate configured to allow two sequential readouts with high and low conversion gain in a same exposure.

10. A method, comprising lowering pixel read noise in an electronic circuit by resetting a pixel a plurality of times, wherein the pixel is reset a plurality of times automatically only during a time period when a signal detected at the pixel is below a predetermined threshold.

* * * * *